US007747468B2

(12) United States Patent
Ji et al.

(10) Patent No.: US 7,747,468 B2
(45) Date of Patent: Jun. 29, 2010

(54) CONTENTS CONSIGNMENT SALE SYSTEM AND METHOD FOR NETWORKING BROADCASTING

(76) Inventors: Eun-Mook Ji, Dongmoon Apt. 7-403, Wonjong-dong 70-1, Ohjung-ku, Bucheon-city, Kyungki-do (KR); Eun-Mi Jhee, 9706 Kingsbridge Dr. 201, Fairfax, VA (US) 22031

( * ) Notice: Subject to any disclaimer, the term of this patent is extended or adjusted under 35 U.S.C. 154(b) by 1122 days.

(21) Appl. No.: 10/481,398

(22) PCT Filed: Jun. 11, 2002

(86) PCT No.: PCT/KR02/01099

§ 371 (c)(1),
(2), (4) Date: Jun. 7, 2004

(87) PCT Pub. No.: WO02/103596

PCT Pub. Date: Dec. 27, 2002

(65) Prior Publication Data

US 2004/0221018 A1 Nov. 4, 2004

(30) Foreign Application Priority Data

Jun. 18, 2001 (KR) .......................... 2001-0034363

(51) Int. Cl.
*G06Q 30/00* (2006.01)
(52) U.S. Cl. .......................................... 705/26; 705/37
(58) Field of Classification Search .................. 705/26, 705/37
See application file for complete search history.

(56) References Cited

U.S. PATENT DOCUMENTS 5,040,062 A 8/1991 Knauer et al. ............... 358/141
5,640,453 A 6/1997 Schuchman et al.
5,892,900 A * 4/1999 Ginter et al. ................. 726/26
5,991,399 A 11/1999 Graunke et al. .............. 380/4
2003/0105718 A1* 6/2003 Hurtado et al. ............... 705/51

FOREIGN PATENT DOCUMENTS

| JP | 09-114787 | 5/1997 |
| JP | 10-302008 | 11/1998 |
| JP | 11-215121 | 8/1999 |
| JP | 11-250145 | 9/1999 |

(Continued)

OTHER PUBLICATIONS

Visual Data Signs Exclusive Agreement with Canada NewsWire to Provide Video Online Distribution Services, published May 3, 1999, downloaded from DialogWeb on Sep. 22, 2009, 4 pages.*

(Continued)

*Primary Examiner*—James ZUrita

(57) ABSTRACT

An Internet broadcasting contents consignment sale system and method. An Internet broadcasting station makes a consignment sale contract with companies or individuals who have copyrights of authored pieces, such as computer and video game makers, filmmakers, music producers, television broadcasting stations, and publishers; generates the consigned authored pieces into specific contents data; allows users to use the contents data only through a specific execution program provided by the Internet broadcasting station; permits Internet users to download the contents via wire and wireless Internet free of charge and keep them; and allows the users to use desired contents data by receiving restoration information on the Internet.

18 Claims, 5 Drawing Sheets

FOREIGN PATENT DOCUMENTS

| | | |
|---|---|---|
| JP | 11-283327 | 10/1999 |
| JP | 11-344926 | 12/1999 |
| JP | 2000-048076 | 2/2000 |
| JP | 2000-113048 | 4/2000 |
| JP | 2000-0036963 | 7/2000 |
| KR | 10-1998-0015802 | 5/1998 |
| KR | 1999-023602 | 3/1999 |
| KR | 1999-024449 | 4/1999 |
| KR | 10-0228942 | 11/1999 |
| KR | 2000-0018237 | 4/2000 |
| KR | 10-2000-0036690 | 7/2000 |
| KR | 10-2000-0036691 | 7/2000 |
| KR | 10-2000-0037294 | 7/2000 |
| KR | 10-20000-036574 | 7/2000 |
| KR | 2000-0054205 | 9/2000 |
| KR | 10-2000-0060590 A | 10/2000 |
| KR | 2000-0072232 | 12/2000 |
| KR | 2001-0000124 | 1/2001 |
| KR | 2002-0022388 | 3/2002 |
| KR | 10-0440495 | 7/2004 |
| WO | 99/22502 | 5/1999 |

OTHER PUBLICATIONS

Yasui, "New Suggestion in Content Distribution by Mitsubishi, Discount by Reading Advertisement," *Nikei Multimedia*, 39:24-25 (1998).
"Television Signal Arrangement Where Selected Signals are Encoded Digitally", Safranek et al., Aug. 13, 1991.
"Contents Receiver Group and IC Card to be Used for the Same", Aikawa et al., Apr. 21, 2000.
International Search Report in PCT/KR02/01099 dated Oct. 4, 2002.
Translated Version of Rudolf Kippenhahn, "Code Breaking: A History and Exploration", EZ-Book, Aug. 31, 2002, pp. 39, pp. 201, Korea.
Translated Version of Behrouz forouzan, "Cryptograph and Network Security", McGraw-Hill Korea, Feb. 26, 2008, pp. 55-60, Korea.

\* cited by examiner

CONTENTS CONSIGNMENT SALE SYSTEM AND METHOD FOR NETWORKING BROADCASTING

This is the U.S. national phase of International Application No. PCT/KR02/1099 filed Jun. 11, 2002, the entire disclosure of which is incorporated herein by reference.

CROSS REFERENCE TO RELATED APPLICATION

This application is based on Korea Patent Application No. 2001-34363 filed on Jun. 18, 2001 in the Korean Intellectual Property Office, the content of which is incorporated herein by reference.

BACKGROUND OF THE INVENTION (a) Field of the Invention

The present invention relates to a contents consignment sale system and method for Internet broadcasting. More specifically, the present invention relates to a contents consignment sale system and method for Internet broadcasting for receiving sales consignments on authored pieces from authors who have programs available for Internet broadcasting, converting the pieces into a predetermined contents data format, providing them to Internet users so that they may select and store desired contents in HDDs (hard disk drives), CDs (compact disks), or DVDs (digital versatile disks) according to their interests, and allowing the users to use the contents through an exclusive execution program. When a user desires to use the contents through the exclusive execution program, the system and method enable the user to receive permission from an Internet broadcasting station and acquire restoration information corresponding to the contents through the Internet, so that the user may use the authored pieces.

(b) Description of the Related Art

Various categories of contents have been provided to users as the Internet has been recently developed, and the field with the most growth latency among them is the entertainment industry, with the biggest market and the biggest growth potential thereof being the music and movie industry.

Not long ago, Internet broadcasting stations provided small moving picture services such as with the film size of 56K, and as high-speed Internet has recently been popularized they have attempted to provide high-quality moving pictures with sizes such as about 300K or 500K. The picture quality, however, is worse than that of the DVD, and the image and sound qualities are worse than those of general videotapes.

When many users concurrently use the moving pictures at the same time, the Internet performance speed becomes slower so that the moving pictures are stopped, the sound may howl, and signals may sometimes be interrupted, thereby causing inconvenience to the user.

In particular, attempting to start a VOD (video on demand) business for receiving fees is problematic, because the current Internet transmission speed and services cannot satisfy the users.

The reason for this is that the moving pictures available on the Internet are very inferior to DVDs and videotapes, and off-line service providers already provide stereo and hi-fi videotapes and DVDs so that users may enjoy movies and music videos with high-quality images and sound data at any time they desire. Therefore, on-line movie rental services are not yet developed.

To activate a VOD business, service providers must provide high-quality image and sound services that are much better than the hi-fi stereo videotapes and equivalent to the qualities of the DVDs, compared to the conventional moving picture services of 300K or 500K currently being provided by the Internet broadcasting stations.

Nowadays, cellular phones and PDA's enabling wireless Internet services are on the market, and in the near future, multimedia terminals capable of wireless Internet will be commonly installed in cars.

In America, more than one million cars with multimedia terminals have been sold, but the speed of the current wireless Internet service is much slower than that of the wire Internet service, and in particular, the Internet speed becomes further slower and the Internet is often disconnected because of the unstable state of wireless radio waves when the car is moving.

Cell phones, PDAs, and vehicular multimedia terminals for providing the wireless Internet service for providing high-quality moving pictures with quality images and sound data in fast moving cars have not yet been properly developed, but the wireless Internet services are involved in the very initial steps by providing such things as an electronic mail service and stock news, mainly for text communication with small data size, and wireless Internet terminals are currently being sold.

The user does not have much difficulty in using general text information such as email, stock information, or news on the wireless Internet while the user is moving, but in the case of attempting to receive a moving picture service, it is required that the mobile station does not move at all but remains at a single place, or it may be moved at the slow speed of a person's normal walking. Currently, it is still difficult for the user to receive high-quality image and sound services.

Further, the wireless Internet tends to have frequent interference by radio waves generated by various electronic home appliances such as radios, TVs, computers or cell phones, as well as cables, and the radio waves may not easily propagate into a room in a building. Even when the radio waves enter a room, they may be easily reflected by a metallic desk or a concrete wall to generate various problems, and hence it is more difficult for the user to use the wireless Internet than the wire Internet, and the speed of the wireless Internet is slower than that of the wire Internet. In addition, in some cases, the user may not be able to use the wireless Internet at all in a basement.

The communication speed when the mobile station remains motionless may be faster according to the development of communication devices, but the above-noted problems may not be completely solved because of the characteristics of the radio waves.

In particular, in the case the user uses the wireless Internet multimedia terminal in a fast running car, since the multimedia terminal cannot fully receive the radio waves while the car is running fast, the data transmission speed is greatly reduced. When the car passes through a tunnel or is on a street with many high buildings, turns around a mountain, goes through a low place, or passes between concrete walls, or when another car or a motorcycle passes closely by the car, there is substantial radio wave interference so that the user cannot receive various moving picture services such as quality movies, dramas, or music videos in the running car.

SUMMARY OF THE INVENTION

It is an object of the present invention to provide an Internet broadcasting contents consignment sale system and method for receiving various authored pieces from authors as consignment, converting them into specific contents data, allowing users to either freely download and save them or freely transmit the data to each other through a reproduction process or the Internet, and enabling an Internet broadcasting station to exhaustively and thoroughly control the users' using the contents so that they may use the corresponding authored pieces with advertisements or for a fee.

It is another object of the present invention for high-speed Internet users as well as low-speed Internet users to use high-quality moving picture contents of premium image and sound data through an Internet broadcasting station according to the present invention.

It is still another object of the present invention to implement multimedia functions of quality image and sound through the wireless Internet in a fast running vehicle without interference of instability of wireless signals or interruption of signals under bad wireless Internet environments, wherein the Internet transmission speed is severely reduced and signals are frequently interrupted by the user's motion because of unstable states of wireless radio waves, and accordingly the user can only receive a moving picture service when he remains still or walks very slowly.

In one aspect of the present invention, a network-broadcasting contents consignment sale system connected to authors for receiving a plurality of authored pieces and providing the authored pieces to user terminals, comprises: a contents data management server for converting a contents data structure of the authored pieces into a predetermined format, transmitting converted data to the user terminal, and generating restoration information for restoring the converted data structure; a data storage unit for storing restoration information for restoring the converted contents data; and a free-of-charge contents provider for providing the converted contents data to the user terminal through a network or a free-of-charge distributor, and wherein the contents data management server transmits the restoration information stored in the data storage unit to the user terminal when the user terminal accesses the contents data management server so that the contents data stored in the user terminal are restored to original contents data and are executed.

The restoration information resides in the user terminal's RAM (or it is temporarily stored in a HDD depending on the contents), and the restoration information restores the converted contents data stored in the user terminal into the contents data of before conversion so that the user may use the contents data, and when the restoration information finishes all tasks, the restoration information is automatically and immediately deleted from the RAM or the HDD.

In another aspect of the present invention, in a network-broadcasting contents consignment sale system for transmitting a plurality of contents data to a user terminal connected on the network, recording the contents data on recording media including CD-ROMs or DVD-ROMs, distributing the contents data free of charge, and controlling users' using the contents data to obtain predetermined use fees from the users, a network-broadcasting contents consignment sale method comprises: converting the contents data's structure, separately generating restoration information (which selectively includes important data, editing codes, and numerical values, depending on the categories of the contents), and storing the restoration information for executing the converted contents data; transmitting the contents data having the converted data structure to the user terminal via the network or recording the contents data on various recording media including CD-ROMs or DVD-ROMs and distributing them to the user free of charge, when a transmission request on the contents data is input from the user terminal; and transmitting restoration information (which selectively includes important data, editing codes, and numerical values, depending on the categories of the contents) that corresponds to the contents data to which a use allowance request is input, to the user terminal so that the user may use the corresponding contents when the use allowance request for the contents data having the converted data structure is input from the user terminal.

The method further comprises transmitting advertisement data and the restoration information to the user terminal, and operating the user terminal to execute the contents and the advertisements, when the user selects to view the contents and the advertisements without paying the use fee of the contents data.

In the case of unifying a plurality of network broadcasting stations into a single relay broadcasting system, a plurality of network broadcasting stations are combined into a single huge network broadcasting station, and each network broadcasting station is applied as a single data storage unit. A relay broadcasting station is configured to manage all the members and uses in an integrated manner, and network users all over the world may use various contents provided by a plurality of member network broadcasting stations through a single membership entrance and perform fee settlement at a single homepage of the relay broadcasting station.

The relay broadcasting station provides technical support and use allowance for managing the above-noted relay broadcasting system, and it may receive technical use fees from the network broadcasting stations that provide the contents, and use fees for the specific execution program from the users (members).

The relay broadcasting station provides the network broadcasting technique supports according to the present invention to a plurality of network broadcasting stations to allow the network broadcasting stations of FIG. 2 to directly manage the network broadcasting, and to allow the users to use the specific execution program of FIG. 3. The user registers for a membership entrance of the relay broadcasting station so as to use and install a specific execution program, and when the user operates the specific execution program, a user terminal initially accesses the relay broadcasting station on the network to check whether the user is a registered member who has previously paid the membership fee, and if so, the user terminal receives a use allowance on the specific execution program to allow the user to access the network broadcasting station. The relay broadcasting station manages membership of the users who use the specific execution program, and the relay broadcasting station receives a predetermined amount of money from the network broadcasting stations as broadcasting technical commissions each month, and receives a predetermined amount of use fees from the users (members) each month to issue a program use allowance on the network, or receives broadcasting technical commissions and program use fees from the network broadcasting stations and the users.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
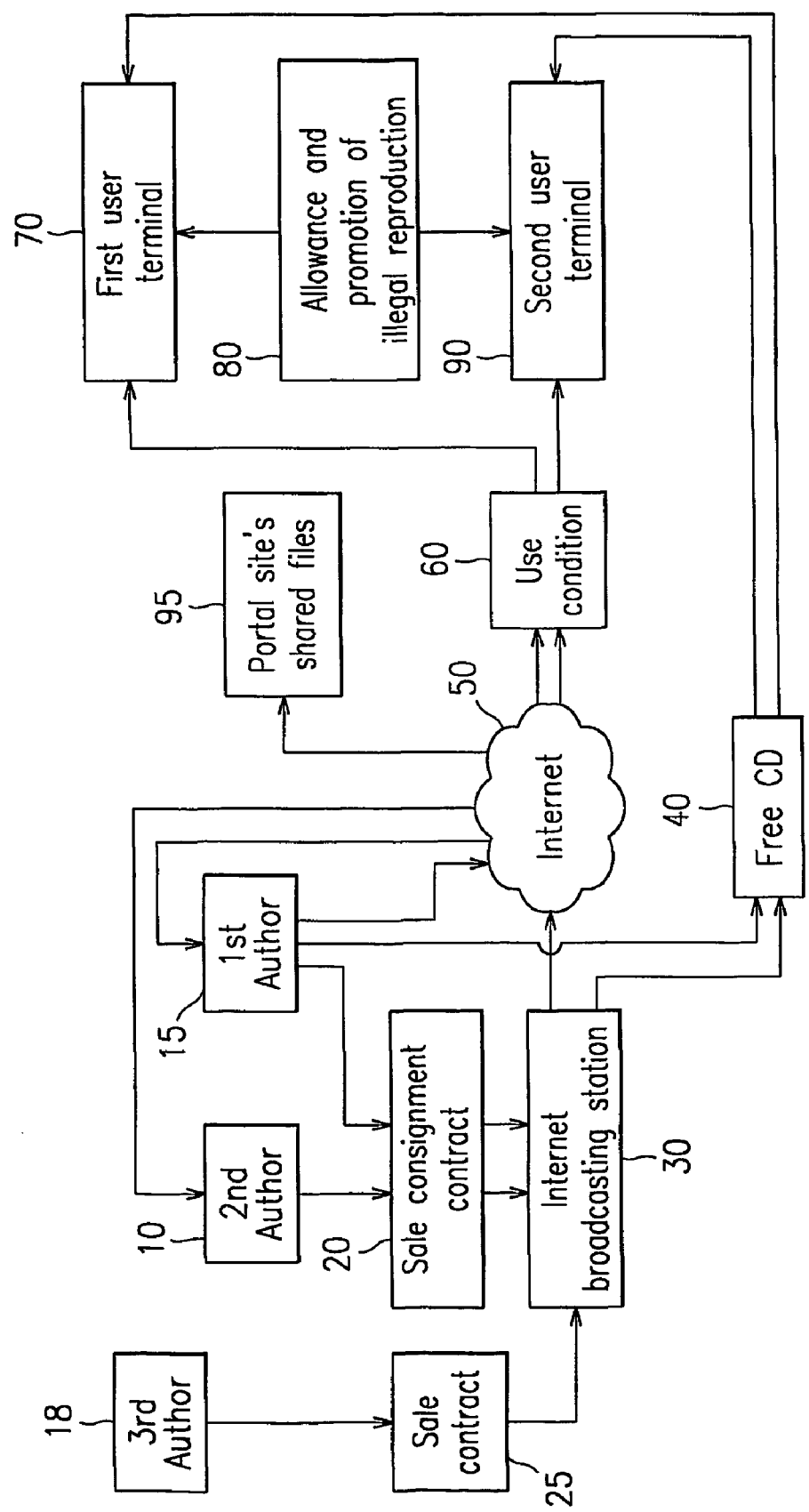
FIG. 1 shows a block diagram of a contents consignment sale system according to a preferred embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

First, contents data provided on-line and off-line by an Internet broadcasting station will be described.

The fast Internet contents data that netizens who use the wire or wireless fast Internet download on the Internet free of charge and without restriction and transmit to their friends on the Internet or through reproduction on a compact disc (CD), in other words, all kinds of entertainment data including movies, dramas, music videos, comics, children's picture stories, photos and photo albums, novels, and computer and video games, are generated as follows.

Moving picture data such as movies or music videos operate at 25 frames per second, that is, about 25 continuous pictures are shown for each second of broadcast time. Comics, children's picture stories, novels, and photos and picture albums do not have continuous pictures, differing from the general moving pictures, but have still pictures or one-page texts for each page.

Hence, the present invention does not make comics, children's picture stories, and novels into still image data, but into a moving picture data file format of 25 frames per second or 10 to 2 frames per second (in this instance, the number of the frames may be varied.)

For example, in the case of making one-page comics into one frame of moving picture data, 500-page comics are made into 500-frame moving picture data. In other words, when the 500-page comics are made into moving pictures of 25 frames per second, they will be 20-second moving picture data, and if they are made into moving pictures of 2 frames per second, they will be about 250-second moving picture data.

In addition to the above-noted method, the comics, the novels, and the children's picture stories may be made into still image data maintaining the original format. In this instance, the contents may be used by scrambling the sequential order of the still image data to generate editing codes, by modifying numerical values of a predetermined portion of a picture data that configures a single still image, or by separating a portion of data from the picture data file to generate restoration information and allowing the user to receive the restoration information on-line and combine it with the converted contents data to generate the contents of before conversion.

When the comics, children's picture stories, novels, and photos and picture albums of a still image format are converted into moving picture files, the user is required to use the contents data frame by frame instead of executing the contents at 25 frames per second or 2 frames per second, that is, executing the contents in 20 or 250 seconds once in the like manner of execution of the general moving pictures.

Audio data may be stored in the children's picture stories, novels, comics, and photos and photo albums to output descriptions or narrative on the picture histories.

When attempting to make the moving picture programs such as movies, music videos, dramas, comics, photos and picture albums, and novels into specific contents data, an important portion is separated from the program data to form "an important data," and the remaining data are divided into dozens to thousands of units and scrambled in a random order to generate the "editing codes," and the format of the data files is converted into various formats so that the data files may not be executed through general programs.

It is desirable to modify the format of the various contents not by a single method but in many different ways for the respective contents so as to prevent attacks by hackers. The specific execution program provided by the Internet broadcasting station may use all the above-noted converted formats.

In a different method, a single program is divided into dozens to thousands of units, the divided units are scrambled in a random order to generate editing codes, predetermined portions are separated from the respective units to generate "an important data," and the formats of the data files are modified to become different each other.

The important data may include a predetermined portion of the contents, for example, a portion of the data of about 0.2 to 3 second running time from the data having the total running time of 10 seconds, or it may include a portion of the actual data that forms audio signals or image signals.

In any of the above-described methods, if the separated data are not combined with the remaining data, the converted contents data are incomplete, and hence the contents data are not executed through any execution program, and if combined, the converted contents data become the original data, that is, the contents data of before conversion.

It is required for the specific execution program to receive the separated important data as restoration information that may be easily combined, and when converting the converted contents data into the original format and executing the same at the user terminal, it is required for the specific execution program to convert the contents data into those of before conversion and execute them with no damage to the image and sound qualities.

The formats of the contents data may be modified in many ways, and it is important to completely prevent the Internet users from using private programs or public programs for illegally using the contents data, instead of using the specific execution program provided by the Internet broadcasting station according to the present invention.

Predetermined numerical values are applied to the various data values of the contents data to convert the data. The data include audio signals, image signals, and programs (in the case of video games or computer games), and it is important to convert the contents data, allow no user to use the contents data normally if the converted contents data are not converted into the original format, and completely restore the contents data into those of before conversion using the restoration information.

In order to download various categories of contents data to the terminal on the Internet and execute them when they are stored in the terminal, the user uses the specific execution program to access the broadcasting station according to the present invention, obtain a use allowance, determine whether to pay a use fee or view the contents together with advertisements, and additionally receive restoration information (including editing codes, numerical values, and important data) for restoring the contents data structure. In this case, the user receives one, two, or three kinds of the above-noted restoration information depending on the categories of the contents.

When attempting to view the contents together with the advertisements without paying the use fee, the user receives the restoration information and customized advertisement data to view the advertisements and the contents together.

The important data in the restoration information may be a single unit, but it is more desirable for the important data to include a plurality of small data so as to increase effects of preventing reproduction.

For example, when moving picture data of a total of 90 minutes are divided into 540 units, the running time of each unit is about 10 seconds, and in this instance, the running time of one unit may be 8.12 seconds in one case and it may be 11.84 seconds in another case. As described, the running time of each unit is randomly generated within plus or minus 20 to 30%, and the important data are preferably generated by separating the data that correspond to the amount of about 0.2 to 3 seconds for each data of 10-second running time.

Hence, the specific execution program initially executes the contents data downloaded to the user terminal, and concurrently receives the important data via the Internet to temporarily store them in a RAM, and when a corresponding order comes, the specific execution program supplements the contents data with the important data to execute the supplemented contents data, then automatically deletes the important data from the RAM.I It previously receives important data of a subsequent order and stores them in the RAM, and when the corresponding order comes, it supplements the important data of the subsequent order to the contents data to execute the supplemented contents data. In addition, about 1 to 15 frames per 40 to 60 frames are separated as the important data for later use, and further modified methods may be used according to the present invention.

When the specific execution program is executed, the user terminal obtains a use allowance, immediately receives the editing codes and the numerical values on-line, stores them in the RAM, receives important data to be supplemented, stores them in the RAM, supplements the important data to the contents data to execute them in the proper order, and deletes the important data from the RAM, and in this case, the categories and number of the restoration information (editing codes, numerical values, and important data) may be varied according to the categories of the contents.

When the amount of the important data is too big to be temporarily stored in the, RAM, the user terminal randomly selects a desired directory from a program that has many directories such as Windows programs or another desired one, converts the important data into a hidden file format, temporarily stores the same in the above-noted directory, shows them to the user when its proper order comes, and immediately deletes the important data from the corresponding directory.

For further detailed description, the user terminal randomly stores the important data in any place and without any predetermined order and deletes them after use, and it previously receives first important data, temporarily stores them in the HDD, and executes the specific execution program to show the important data to the user, and then deletes the shown important data from the HDD.I It subsequently receives second important data, temporarily stores them in the HDD, shows them in the appropriate order, and deletes them, so that the user may not easily find the data and reproduce the same.

What is important in this case is that the important data preferably reside in the RAM and are deleted in the default manner, and when the amount of the important data of the contents used by the user is too big to be temporarily stored in the RAM and must accordingly be temporarily stored in the HDD, it is shown to the user in its appropriate order and then deleted. Various kinds of restoration information including the contents data, the important data, the editing codes, and the numerical values currently used by the user are not to concurrently reside in the user terminal for more than 0.001 second, and therefore, it is required to divide the important data into many units.

In addition, programmers may modify the important data according to corresponding environments in many ways.

What matters here is that the Internet broadcasting stations are to produce and manage the contents data so that the user may execute them when the user receives restoration information on-line, in order for the Internet broadcasting stations to perfectly control the users all over the world.

Second, in order for wire and wireless low-speed Internet users to freely use the contents data, the Internet broadcasting stations according to the present invention produce the contents data for telephone modem users and low-speed Internet users, as follows.

The data that form a program are divided into dozens to thousands of units, the units are scrambled in a random order, and the format of the data files is converted into an individual one. In this instance, the contents data are converted by applying a predetermined numerical value to the data values (including still image data and moving picture data), and this process may be possible or not depending on the contents.

It is desirable to allow no one to normally use the contents data without permission except when any user purposely damages the converted audio or image signals to convert them back into the original format.

To make the important data have a lesser size and better effects, a very small portion of the data that correspond to either or both of the image signals and the audio signals are separated to make them the important data.

Therefore, when attempting to use the contents data, the users use the specific execution program to access the Internet broadcasting station according to the present invention, checks membership status to obtain a use allowance, and determines whether to pay a use fee or view the contents data together with the advertisements. In this instance, the user is also required to receive the important data, the editing codes, and the numerical values for restoring the contents data structure. When desiring to view the advertisements instead of paying the use fee, the user is required to receive corresponding advertisement data. Here, the restoration information includes one, two, or all of the important data, the editing codes, and the numerical values depending on the contents. As the categories of the restoration information increase, the function for protecting the contents data from hackers becomes better.

The Internet broadcasting station according to the present invention records various contents data produced through a predetermined method on various recording media such as CD-ROMs, CD-RWs, DVD-ROMs, and DVD-RWs, and distributes them free of charge for promotion so that many users may easily use them. The Internet broadcasting station also allows and promotes any kind of unauthorized reproduction of the contents data so that the users may reproduce the contents free of charge and share them with their friends without authorization The Internet broadcasting station uploads high-speed Internet contents data and low-speed Internet contents data so that the low-speed Internet users may also request their high-speed-Internet-using friends to download various contents data for them, and thereby keep the contents data freely. The high-speed Internet users may use both high-speed Internet contents data and low-speed Internet contents data.

Third, in order for the high-speed and low-speed wire and wireless Internet users to freely download and use various computer and video games, and personal and business programs, the Internet broadcasting station according to the present invention generates various programs, as follows.

A predetermined portion without which the program may not operate is separated from the program, or predetermined numerical values of data in the program are changed so that the program may not operate without a use allowance provided by the Internet broadcasting station. Therefore, to normally operate the program, it is required that dozens to hundreds of numerical values such as secret codes be supplemented, or that the separated portion of the program be supplemented.

The program may be designed to operate when the numerical values or the separated portion is supplemented, or preferably when both the numerical values and the separated portion are supplemented. The above-noted game or business programs are designed to start their operation only with the specific execution program provided by the Internet broadcasting station according to the present invention, and the users are allowed to freely download the game programs and the business programs produced through a specific method and keep them.

The Internet broadcasting station according to the present invention records the business and game programs on various recording media such as CD-ROMs and DVD-ROMs, and distributes them to many users free of charge. The Internet broadcasting station allows and promotes the unauthorized reproduction of the programs so that the business and game programs may be stored in the HDDs, the CD-ROMs, and the DVD-ROMs of the user terminals.

Accordingly, when attempting to use the game and business programs, the user is required to use the specific execution program to access the Internet broadcasting station, check membership status, obtain a use allowance, determine whether to pay a use fee or view advertisements together with contents, and receive on-line one or both predetermined numerical values of data for restoring the converted program structure of the game programs and the business programs and a portion of the program, and when the user determines to view the advertisements without paying the use fee, additionally receive the advertisement data to view the advertisement data together with the game program or the business program.

In the process for generating restoration information, it is required to apply no routine to the process when dividing the contents data into a plurality of units and scrambling them to generate the editing codes, when separating the important data from the contents data and when modifying the numerical values. Namely, by differentiating the restoration information and the numerical values for the respective contents data, attacks by hackers who attempt to solve the converted contents data will be blocked.

FIG. 1 shows a block diagram of a contents consignment sale system for Internet broadcasting according to a preferred embodiment of the present invention.

An operation of the contents consignment sale system will now be described.

First, the Internet broadcasting station 30 enters into a sale consignment contract 20 with the authors 10 and 15, and converts their authored pieces into specific contents data.

The Internet broadcasting station 30 allows many users to freely download or receive the contents data wirelessly or through the wire Internet 50.

The Internet broadcasting station 30 also saves the specific contents data on recording media such as CD-ROMs and DVD-ROMs 40, and freely distributes them to places where many Internet users gather such as computer shops, computer program shops, or computer book stores.

Further, the Internet broadcasting station 30 exceptionally and aggressively allows the users to reproduce the specific contents data freely distributed on the Internet and the CD-ROMs without formal permission 80 by the Internet broadcasting station 30, and promotes unauthorized reproduction 80 (transmitting and receiving data through reproduction of CDs, DVDs, the Internet, etc.) so that the users may reproduce the specific contents and share them with friends.

Also, the Internet broadcasting station 30 uploads contents data and specific execution programs to the shared file directory 95 at any time so that the many Internet users may use them freely and conveniently, and accordingly stores as much contents data in their HDDs as possible.

When the user attempts to use the contents, a use condition 60 is required. That is, the user must either pay for the contents or view a customized advertisement sent by the Internet broadcasting station 30 together with the contents. If not, the contents may not be used. In order to execute this complete control, the Internet broadcasting station 30 converts the various programs provided by the authors into specific contents data that the users may only use through a specific execution program.

The authors are classified into several categories. The first author 15 owns the first author's server, and the first author converts various programs possessed by the first author into specific data using the technique according to the present invention, and directly provides the converted data to users through the Internet 50.

However, when the user uses the contents data, it is required for a user terminal to receive restoration information on the Internet 50. The first author stores restoration information in a data storage unit of the Internet broadcasting station 30, and when the user executes a specific execution program, the first author allows the user terminal to automatically access the Internet broadcasting station 30 so as to obtain restoration information.

In order for the many users to use the author's programs and to get more profit, the first author stores the contents data on various recording media including CD-ROMs and DVD-ROMs 40 and distributes them free of charge.

Also, the first author uploads the contents data and the specific execution programs to well-known portal sites' shared file directories 95 frequently to make them public so that many users may easily obtain desired contents data.

The first author mostly includes big companies such as movie companies, television broadcasting stations, and huge publishers rather than individuals.

The second author 10 mainly includes small companies or individuals who possess many authored pieces, and the second author 10 does not directly provide the contents data to the users, but uses the server of the Internet broadcasting station 30.

Figure 2:
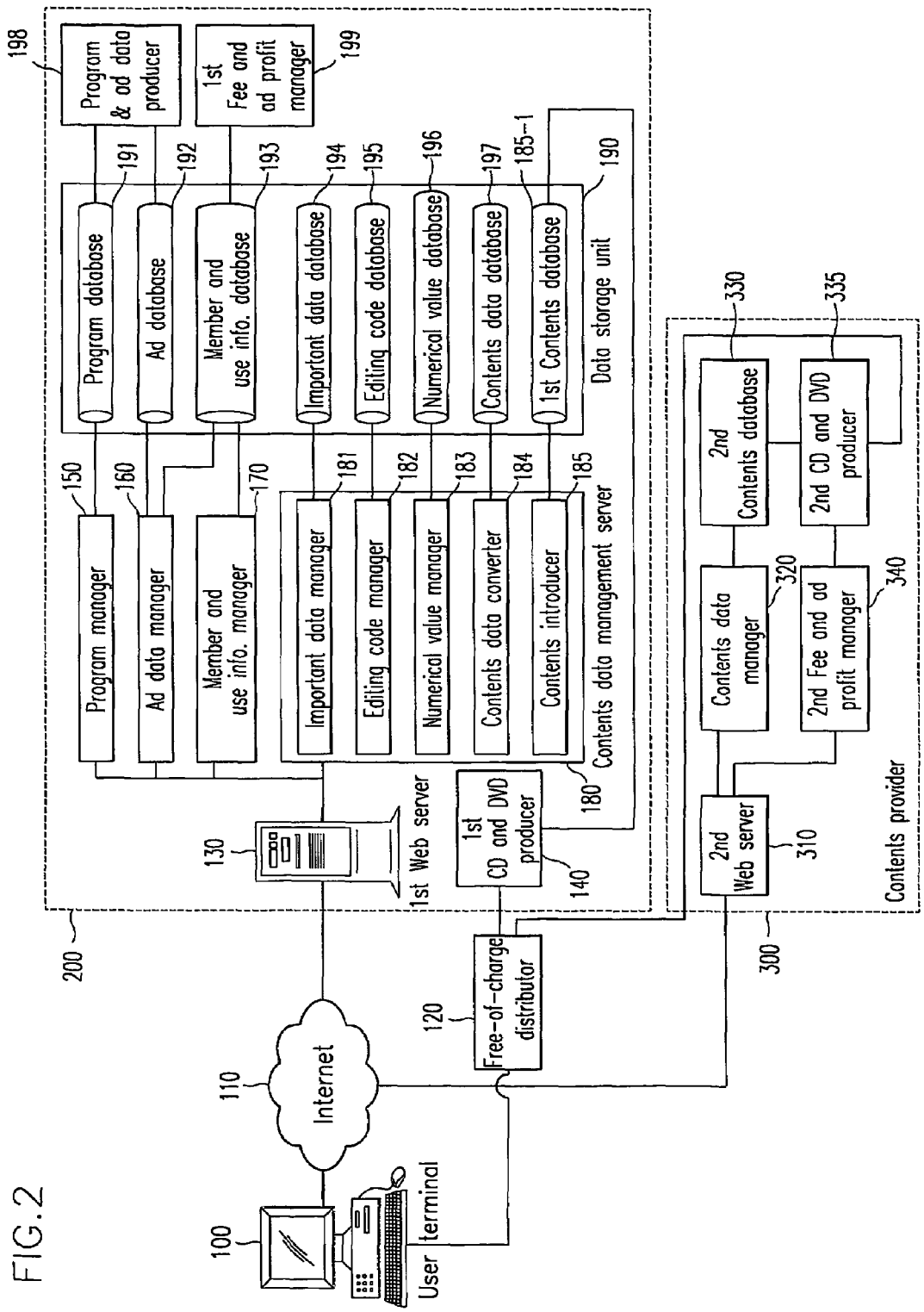
FIG. 2 shows a block diagram of an Internet broadcasting system according to a preferred embodiment of the present invention.

In the case of the first and second authors 15 and 10, the first fee and advertisement profit manager 199 of FIG. 2 of the Internet broadcasting station controls the computers of the first and second authors 15 and 10 in real-time so that the authors may monitor the categories and the frequency of use of the contents used by the users, and so they may know how much in fees and advertisement profits are deposited, in real-time.

Further, the first fee and advertisement profit manager 199 supports the authors to check the programs' popularity, that is, the frequency of use, with graphs for each time and day so that the authors may refer to them for publicity campaigns and program production and planning, and produce better programs with reference to them.

The third author 18 generally includes very small companies or individuals who have several programs, and in this case, the third author sells the programs possessed by the third author to the Internet broadcasting station by one-time allowance or by installment.

In certain cases, some companies or individuals may provide their programs free of charge so as to widely promote or propagate their works. For example, singers frequently release their music videos so as to publicize their songs.

FIG. 2 shows a block diagram of an Internet broadcasting contents consignment sale system (in other words, an Internet broadcasting station) according to a preferred embodiment of the present invention.

The Internet broadcasting station 200 is connected to a user terminal 100 and a contents provider 300 through the Internet 110.

The Internet broadcasting station 200 comprises: a first web server 130; a first CD and DVD producer 140; a program manager 150; an advertisement data manager 160; a member and use information manager 170; a program and advertisement data producer 198; a first fee and advertisement profit manager 199; a contents data management server 180; and a data storage unit 190.

The contents provider 300 comprises: a second web server 310; a contents data manager 320; a second contents database 330; a second CD and DVD producer 335; and a second fee and advertisement profit manager 340.

The first web server 130 performs a web access function for a plurality of user terminals 100 to access the contents provider 300 through the Internet 110, and it transmits various contents data, corresponding restoration information, and specific execution programs provided by the Internet broadcasting station 200 to the user terminal 100.

The program manager 150 provides a specific execution program to the user terminal 100. The specific execution program is needed for using the contents when the users desire to do so after they freely download various contents data such as movies, music videos, comics, and novels that are produced in a specific manner to their computers from the Internet broadcasting station, to collect them and store them.

In order to use the contents data, users all over the world register themselves to the Internet broadcasting stations, download the specific execution program to their computer 100, and install the same.

When the user attempts to use the downloaded contents data, it is required for the user either to pay the fee for using the contents or to view the advertisement together with the contents, and when the user accordingly selects to view the advertisement together with the contents without paying the fee, the advertisement data manager 160 transmits a customized advertisement that creates the best advertisement impacts to the user terminal 100 using member information.

In this instance, since the customized advertisement is well known to persons skilled in the art, no corresponding description will be provided. In some cases, the user is required to pay a predetermined fee depending on the categories of the contents such as new-release movies and recent music videos.

The member and use information manager 170 manages all kinds of member information provided when the Internet users register on the Internet broadcasting station, and manages the categories of the contents data downloaded by the members, the frequencies of use on the contents data, categories and frequencies of use of the advertisement data viewed by the members, and fee history for each time and date.

The contents data management server 180 comprises: an important data manager 181 for separating an important portion from the contents data, and transmitting the important portion as restoration information; an editing code manager 182 for generating editing codes of the contents data, and transmitting the editing codes as restoration information to the user terminal 100; a numerical value manager 183 for converting the numerical values of the contents, and transmitting the numerical values for restoring the converted numerical values into an original format as restoration information to the user terminal 100; a contents data converter 184 for converting various programs (or contents) consigned by the authors into specific contents data, and transmitting them to the user terminal 100; and a contents introducer 185 for generating descriptions of the contents, transmitting the descriptions to the user terminal as restoration information, and when a request for transmitting the contents data or a request for using them is provided by the user terminal 100, enabling the user terminal to receive the requested contents data and corresponding restoration information.

The data storage unit 190 comprises: a program database 191 for storing specific execution programs; an advertisement database 192 for storing various advertisement data; a member and use information database 193 for storing member and use information; an important data database 194 for storing important data; an editing code database 195 for storing editing codes; a numerical value database 196 for storing numerical values; a contents data database 197 for storing the converted contents data; and a contents database 185-1 for storing description data for introducing the contents data, and storing restoration information corresponding to the contents data.

The program and advertisement data producer 198 produces a specific execution program and various advertisement data and uploads them to the program database 191 and the advertisement data database 192.

The first fee and advertisement profit manager 199 calculates all necessary items in real-time such as date, time, number of times, and what categories of the contents data the user uses, how much the user pays for the corresponding fee, how many times and what advertisement the user views, how much advertisement income and use fees are generated, and how much the total profit is. The first fee and advertisement profit manager 199 controls computers of the contents providers 300 and analyzes in detail how much earnings are generated after the prior settlement up to the present state, and notifies the second fee and advertisement profit manager 340 of analysis results in real-time.

The CD and DVD producer 140 records promotional contents data on CD-ROMs, DVD-ROMs, and other huge-volume recording media so that the Internet broadcasting station may lead more users to utilize the contents data.

The free-of-charge distributor 120 includes computer shops, software shops, or computer bookstores where the Internet users may get CD-ROMs or DVD-ROMs that contain the above-noted contents data free of charge.

The contents provider 300 comprises a second web server 310, a contents data manager 320, a second contents database 330, a second CD and DVD producer 335, and a second fee and advertisement profit manager 340.

The second web server 310 allows the user terminals 100 of the Internet users all around the world to access the contents provider via the Internet 110.

The contents data manager 320 transmits the contents data provided by the contents provider to the user terminal 100.

The second contents database 330 stores great volumes of contents data that the users may download to their computers on the Internet or acquire them through recording media such as CD-ROMs or DVD-ROMs.

The second CD and DVD producer 335 records on the recording media the contents data that are provided to the users for the promotional purpose through the free-of-charge distributor 120.

The second fee and advertisement profit manager 340 receives signal data from the first fee and advertisement profit manager 199 of the Internet broadcasting station 200, and allows the contents provider to monitor how much earnings are gained, what contents and how many times the users use, how much in fees the users pay for viewing the contents, how many users view the advertisements and use the contents, and the users' frequencies of use on the respective contents by time and by date.

The user terminal 100 includes: a notebook computer or a desktop computer used for homes, offices, factories, and schools; a server computer supporting wire or wireless Internet; a wireless Internet portable phone terminal; a wireless Internet PDA terminal; and a wireless Internet multimedia terminal (a transformation of a personal computer) installed in a car.

An operation of the specific execution program in the Internet broadcasting contents consignment sale system (referred to as an Internet broadcasting station hereinafter) will now be described with reference to FIG. 3.

First, the user downloads various desired contents data provided by the Internet broadcasting station 200, the contents provider 300, the free-of-charge distributor 120, or friends to an HDD of the user's terminal 100, receives the contents data from them via CD-ROMs, or reproduces them to save them in the HDD of the user's terminal 100.

When attempting to use the contents data downloaded from the Internet broadcasting station, the user receives a specific execution program and installs the same in the user terminal 100.

When the specific execution program is performed in the user's terminal 100 in step S500, a CPU (central processing unit) of the user computer initially checks a connection state to the Internet in step S510.

When the Internet is not connected, the user terminal 100 issues a first warning to access the Internet in step S520, and terminates the current task in step S650.

In this instance, when it is connected, the user computer accesses the Internet broadcasting station 200 in step S530.

Next, the user selects whether to execute the previously downloaded and stored contents data or to download new contents data in step S540.

Here, if the CPU of the user terminal 100 has a very fast processing speed and the Internet has a very fast transmission speed, the user may select both methods at the same time, but in the present embodiment, the user is assumed to select one of them.

Initially, in order to execute the downloaded contents data, the user selects the option of contents execution.

The user selects desired contents from among the contents data downloaded and stored in the HDD, or transmitted through the CD-ROMs or the DVD-ROMs in step S550.

The operation of the user terminal 100 when the user attempts to select desired contents will now be described.

Each time the user clicks the title of the contents data stored in the HDD, the CD-ROM, or the DVD-ROM, the user terminal 100 receives data corresponding to descriptions of the contents data from the contents introducer 185 of the Internet broadcasting station in step S560, and displays a brief description together with images of important scenes. Therefore, the user refers to them to select desired contents data by clicking a mouse button twice.

When the user inputs an ID and a password that are provided to the user when the user performs the membership entrance, the member and use information manager 170 performs a use-allowance process to find whether the user is a registered person in step S570.

When the user's membership is confirmed, the user terminal 100 searches data of the restoration information corresponding to the contents data selected by the user from the contents introducer 185, and receives corresponding restoration information from the contents data management server 180 in step S580.

The actual restoration information includes editing codes, numerical values, and important portion data, and it may include one, two or all of them according to categories of the contents, and it is preferable to use all of them so as to prevent hacking.

The member and use information manager 170 asks a settlement method of the user when the user terminal 100 receives the restoration information. That is, the member and use information manager 170 provides the user with options such as paying the fee through a credit card or other methods, and viewing the contents together with advertisements.

In this instance, when the user selects the option of viewing the contents together with advertisements, the advertisement data manager 160 transmits the restoration information including the advertisement data to the user terminal 100, and the user terminal 100 receives them and stores them in the HDD.

It is preferable to temporarily store other restoration information except the advertisement data and the contents data not in the HDD but in a RAM so as to immediately and automatically delete them after use.

When the corresponding settlement is finished, the user terminal 100 receives the restoration information in step S580, and converts the stored contents data into contents data of before conversion and immediately executes them in step S590.

When the user selects a temporary pause, the user terminal 100 automatically deletes restoration information excluding the advertisements so as to prevent incursion by hackers. When the user executes a "play" instruction again, the user terminal receives the restoration information again, and executes the contents data from the pause point.

If detecting a copy instruction for hacking, or other kinds of task instructions while executing the contents data, the user terminal 100 stops all executions, deletes the restoration information, and immediately terminates the operation in step S650.

When the execution of the contents data is finished, the user terminal 100 checks use information such as categories and number of advertisements viewed by the user while viewing the contents, whether the user pays the fee for using the contents, how many hours and times the user uses the contents in step S610, and when the contents are completely executed, the user terminal 100 terminates the contents-using service in step S620.

Next, the user terminal 100 transmits the use information checked during the above stage to the member and use information manager 170 of the Internet broadcasting station 200 in step S630.

When the user's use allowance is rejected in the previous step S570, the member and use information manager 170 allows the user to enter the membership and use the corresponding service, it notifies the user of the incorrect ID and password and to check them again, it describes settlement methods, or it issues a second warning message that matches the corresponding situation in step S600, and then it terminates the operation in step S650.

In the case of using computer game programs or business programs, when the use allowance step S570 is finished, the user terminal 100 executes the contents data in step S590 to start a computer and video game or a business program.

Next, the user terminal 100 combines the restoration information received after checking the membership with the game program or the business program to convert the modified or incomplete game program or business program into a normal program and execute the same.

The user terminal 100 checks the use information in step S610 in the identical manner of other contents when the game program or the business program is finished, and the steps S620 and S630 are performed, and the above process is terminated in step S650.

However, in the case of a game program, the game may be finished once within a very short time period in the contents data execution step S590, and accordingly, the time and the execution of the game may be linked together.

In other words, if the user easily finishes the game in a minute, the user is allowed to execute the game for a further several times for about 30 minutes without performing the step S570 of use allowance, and if the user is playing a game when 30 minutes elapses, the use of the game program is terminated in step S620 when the user finishes the game.

However, these items (e.g., use time, use number, etc.) may be determined or varied according to autonomous business policies of the Internet broadcasting station 200.

On the other hand, when desiring to receive new contents data in the selection step S540, the user may access the Internet broadcasting station's homepage to select desired contents data from among various contents data in step S660 and freely download them.

In this instance, when the user clicks the desired contents' name, the user terminal 100 receives a description of the corresponding contents from the contents introducer 185 in step S670, and introduces the contents to the user so that the user may adequately select desired contents.

The user then selects again in step S665 whether to only download the contents data or to download the contents and view them concurrently.

An operation of downloading only will now be described.

The user clicks the name of the desired contents data twice, and the contents data converter 184 loads corresponding contents from the contents data database 197 and downloads them to the user terminal 100 in step S680.

Also, while the user terminal 100 downloads the contents data, the advertisement data manager 160 transmits advertisement data to the user terminal 100 as restoration information in step S670, and the user terminal 100 executes them to display a moving picture advertisement on a screen in step S690.

In this instance, the number and categories of advertising are established according to the Internet broadcasting station's business policies.

When the downloading is finished in step S700, the user terminal 100 transmits to the member and use information manager 170 information such as the category and the number of the downloaded contents and the advertisement data executed during the downloading in step S710, and terminates the downloading in step S650.

When attempting to use the contents while downloading the same in the selection step S665, the user is initially required to receive a use allowance in step S720.

Here, the user inputs an ID and a password given to the user at the time of membership entrance. When the user's membership is confirmed, the user terminal 100 finds data on the restoration information corresponding to the contents data selected by the user from the contents introducer 185, and receives corresponding restoration information from the contents data management server 180 in step S722.

The user terminal 100 starts to receive the restoration information and asks a settlement method of the user to find whether the user will pay the fee for using the service or if the user will view the contents together with the advertisement, and in the case of paying the fee, whether the user will settle the same using a credit card or with another settlement method.

In this instance, when the user selects to view the contents together with the advertisement, the user terminal 100 receives the advertisement data as restoration information and stores the same in the HDD.

The restoration information comprises important portion data, numerical values, editing codes, advertisement data, and contents description data. The remaining restoration information excluding the advertisement data and the contents description data is preferably stored not in the HDD but temporarily in the RAM, and it is deleted immediately after it is used. When the settlement is finished, the user terminal 100 receives restoration information in step S722, and uses the editing codes to virtually form a data file that has a time (frame) and a format identical with those of the actual contents data, and store them in the HDD in step S723.

The user terminal 100 uses the editing codes to receive the contents data selected by the user from the contents data management server 180 of the Internet broadcasting station 200 in the actual order and section by section, and it edits them and arranges the same in disorder into a virtual moving picture file generated in the user terminals HDD in step S724.

When the contents data are stored to a certain extent, the user terminal 100 executes the contents data in step S725. That is, the user terminal 100 displays the advertisement, and adds an editing code, a numerical value, and important portion data to execute the contents data as if they are an original program.

When the user temporarily pauses execution of the contents data while they are reproduced, the user terminal 100 deletes virtual files and restoration information except advertisement data and contents introducing data so as to prevent attacks by hackers, if any.

When detecting a copy instruction or other kinds of task instructions for the purpose of reproduction and hacking while executing the contents data, the user terminal 100 deletes restoration information except contents introducing data and advertisement data, stops all the current executions, and terminates the process in step S650.

When the execution of the contents data is almost finished, the user terminal 100 checks in step S726 for all kinds of use information such as categories and iteration number of advertisements viewed by the user together with the use of the contents, whether the user uses the contents after paying the fee, and how many hours the user uses them, and when the execution of the contents data is completely finished the user terminal 100 terminates the use of the contents data in step S727 and it transmits use information checked during the current operation to the member and use information manager 170 of the Internet broadcasting station 200 in step S728.

When the use allowance is rejected in the use allowance step S720, the user terminal 100 displays the rejection reason about the use: allowance on the screen in a message format, generates a third warning message in step S721, and terminates the operation in step S650.

Figure 4:
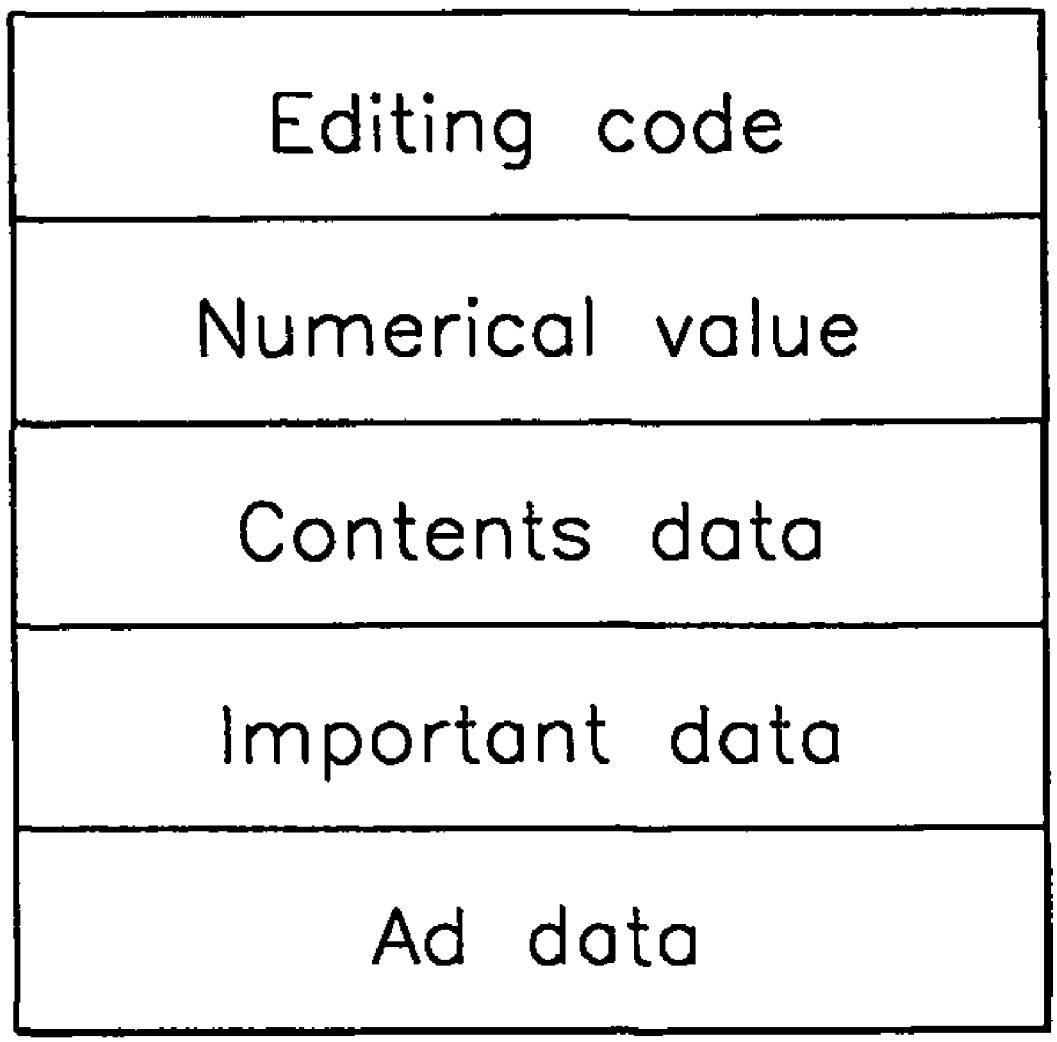
FIG. 4 shows a table for restoration information transmitted to a user terminal.

As shown in FIG. 4, the configuration of the restoration information described above comprises editing codes, numerical values, contents data, important data, and advertisement data, and the configuration may be added, deleted, or modified if necessary.

Figure 5:
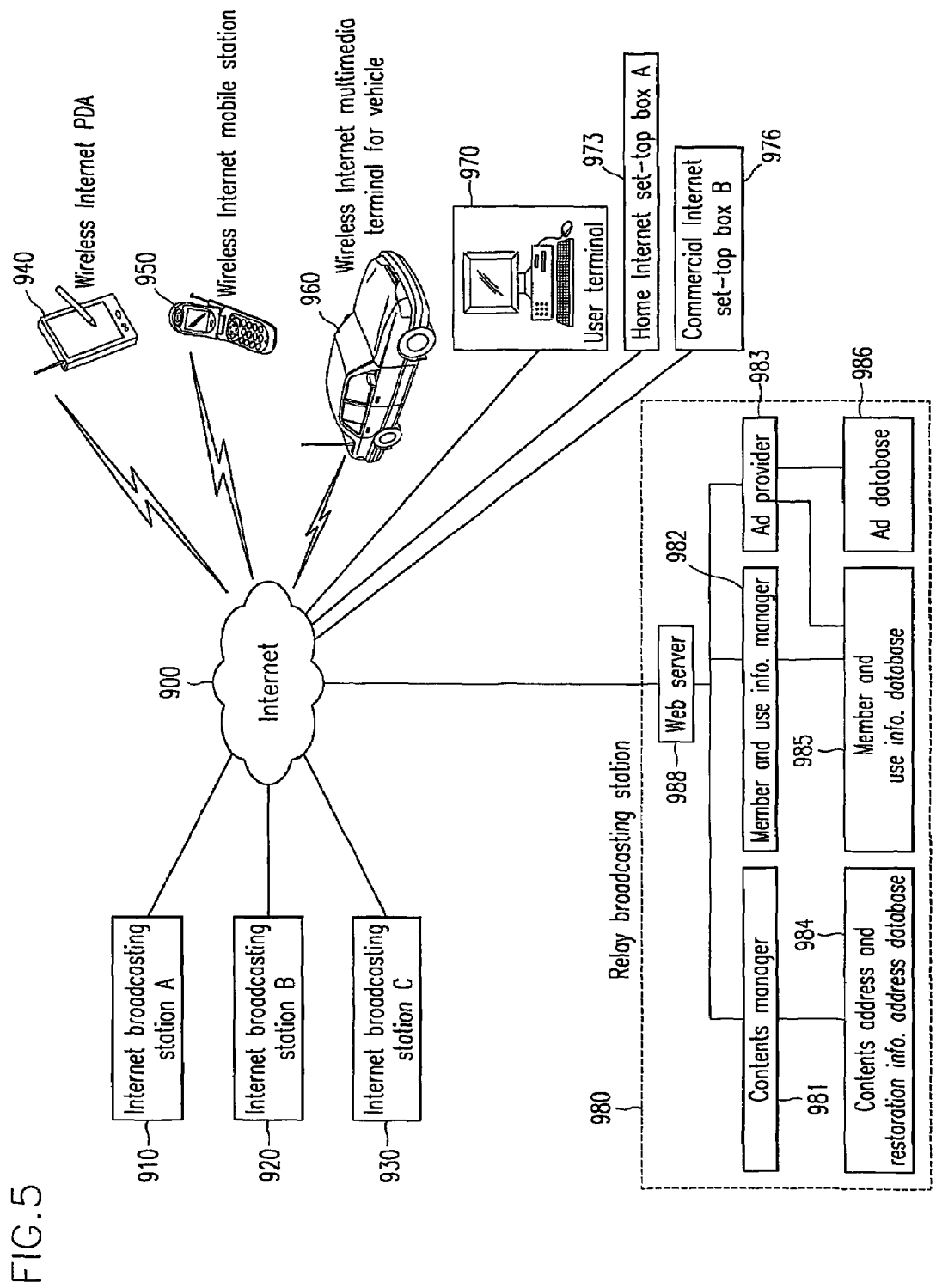
FIG. 5 shows a relay broadcasting system according to a preferred embodiment of the present invention.

FIG. 5 shows an example for applying the Internet broadcasting station to a configuration of a relay broadcasting system, and a method for performing relay broadcasting will now be described in detail.

When attempting to execute the specific execution program at the user terminal 100 in the case of applying the relay broadcasting system, the user is initially required to register for a membership to the relay broadcasting station 980 before installing the specific execution program.

When the user operates the installed specific execution program, the user terminal 100 accesses the relay broadcasting station 980 to receive all contents data, be permitted to obtain a use allowance, receive restoration information, and settle the fee to the relay broadcasting station to use all categories of contents. The Internet broadcasting stations 910 to 930 may not necessarily possess their own homepage, but have a contents data storage unit and a restoration information data storage unit. The relay broadcasting station 980 directly manages all users' member and use information, and the users may receive all categories of contents data provided by a plurality of Internet broadcasting stations through a single homepage of the relay broadcasting station, obtain a use allowance, and receive restoration information. The relay broadcasting station 980 receives settled use fees on the contents data from the users, keeps a predetermined portion as commission, and provides remaining portions to the respective Internet broadcasting stations 910 to 930 that provide the contents data depending on the used amounts of contents data.

Also, when desiring to receive monthly membership fees from the many Internet broadcasting stations and the specific execution program users instead of relaying the contents data, the relay broadcasting station allows the Internet broadcasting stations all around the world to use the method according to the present invention, provides technical support, and in return receives a predetermined portion of sales as a royalty.

Further, the relay broadcasting station may allow the Internet users to use the specific execution program and receive a predetermined portion of money each month as a program use fee (determined by the relay broadcasting station according to national incomes, such as 5 dollars in the U.S., and 2000 won in Korea.)

To achieve this method, a relay broadcasting station is provided, and all the specific execution programs are configured to be executed when the user is registered to the relay broadcasting station and installs the execution program. Each time the execution program is executed, the user terminal 100 initially checks whether the user is a registered member who accessed the relay broadcasting station on the Internet and has paid the membership fee or an unregistered member who has not paid the membership fee, and allows the program to be executed for the registered member.

In this instance, the Internet broadcasting stations 910 to 930 comprise an Internet broadcasting contents consignment sale system of FIG. 2 for providing the Internet broadcasting service according to the present invention.

Figure 3:
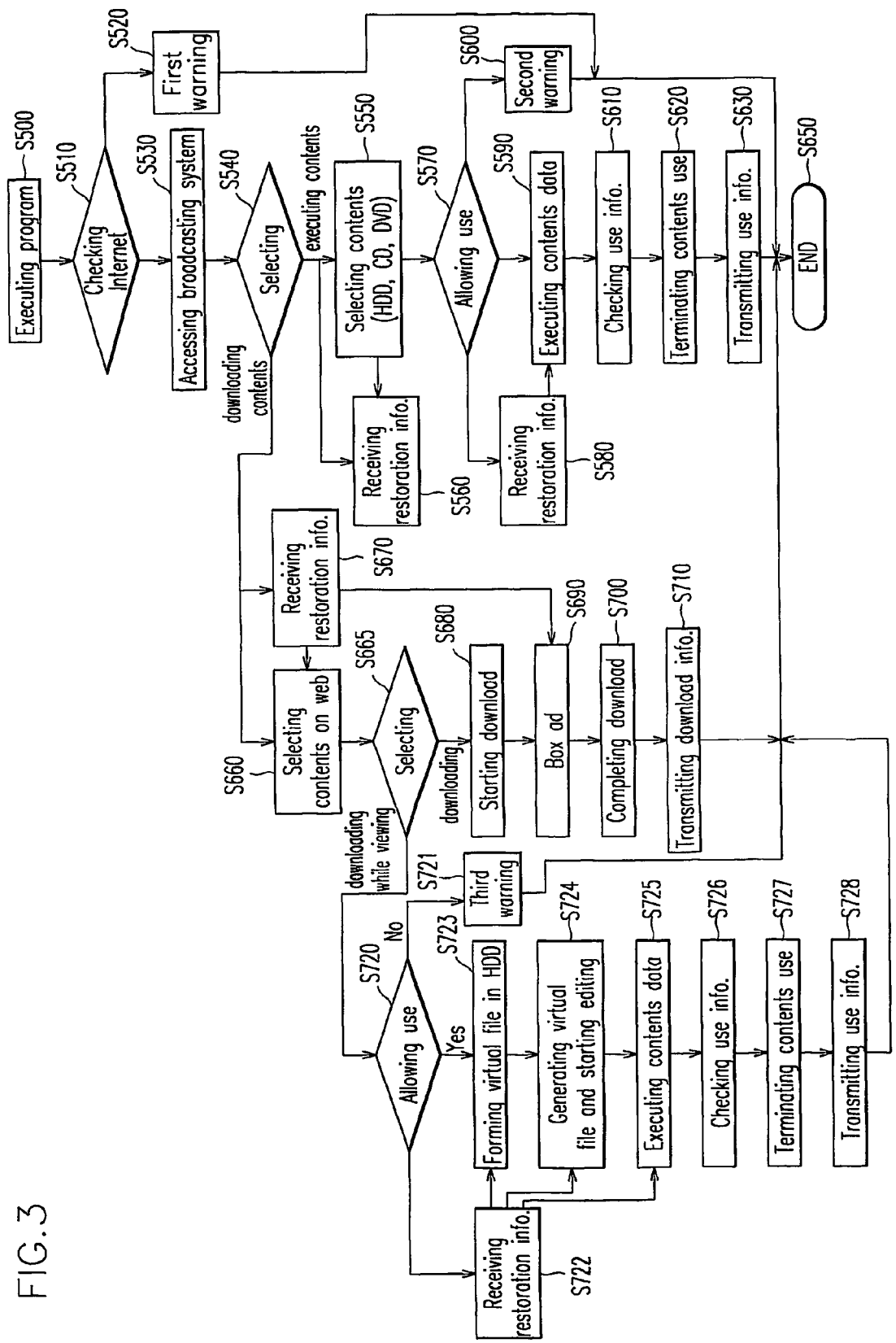
FIG. 3 shows a flowchart of a specific execution program according to a preferred embodiment of the present invention.

The terminal in which the specific execution program is installed as shown in FIG. 3 comprises a wireless PDA 940, a wireless Internet mobile station 950, a wireless Internet multimedia terminal 960 for vehicles, a user terminal 970, an Internet set-top box A 973, and an Internet set-top box B 976.

The above-noted terminals are wire or wirelessly connected to the relay broadcasting station 980 on the Internet 900. The user terminal 970 comprises desktop computers used for offices, homes, factories, and other places, notebook computers, and various kinds of servers. The Internet set-top box A 973 may generate high-quality outputs through output ends such as a VHS end, an S-VHS end, a DV end, and an HDTV end, and it may be used for general or commercial purpose so that the users may view various moving pictures or play video games or various computer games at home, in the office, or in a game room. The Internet set-top box B 976 enables a premium, wider, and magnifiable screen so that it may be combined with a professional big video projector for business purpose only, and it may display moving pictures such as movies or music videos in a small theater. When high-performance graphic cards and high-performance widescreen projectors are released that are much better than the conventional products, movies manufactured by filmmakers may also be converted to contents data and transmitted on the Internet in the like manner of the Internet broadcasting stations, and accordingly, theaters all over the world may receive them on the Internet, convert them into original contents data using the specific execution program, and show them on the screen, thereby building a big theater system. Therefore, the film industry will no longer use film packs, and premium quality movies that do not deteriorate even after repeated use or a longer time has passed may be shown. The filmmakers are then not required to directly distribute the movies to the theaters through a complex distribution structure, and since the theaters and the filmmakers together check movie screening numbers through computers, they may accurately and fairly share the profits.

For a further detailed description of the relay broadcasting system, the wire or wireless Internet users receive various categories of contents data from the Internet broadcasting stations A to C via the Internet or storing/recording media such as CDs or DVDs.

When the user attempts to use contents data, a specific on-line execution program that is developed and distributed by the relay broadcasting station is required, and when the user desires to use the execution program, the user needs to install it and register as a member to the relay broadcasting station on-line so as to use the same next time.

When the users execute the specific execution program, the user terminal operates as follows.

When an Internet user receives desired contents data provided by various Internet broadcasting stations all over the world from the homepage of the relay broadcasting station, and selects desired contents data from among them at the execution program, the user terminal reads a title of the selected contents data and immediately accesses the member and use information manager 982 through the web server 998 of the relay broadcasting station 980 in a wire or wireless Internet manner.

The member and use information manager 982 searches the member and use information database 985 to check whether the user is a registered member who is authorized to use the execution program or an unregistered member, and settles the corresponding use fee. Next, the user terminal accesses the contents manager 981 to find an address of the Internet broadcasting station that provides the contents data selected by the user, and accesses the Internet broadcasting station's server to receive restoration information corresponding to the selected contents data.

When the user selects to view the contents data together with advertisements without paying the fee, the relay broadcasting station concurrently reads the user's information from the member and use information database 985 to find customized advertisements that are the most appropriate for the user from the advertisement database 986, and transmits several advertisements to the user terminal through the advertisement provider 983 either once for all (from one to ten advertisements) or slowly and with ample time while the user uses the contents.

It is desirable to check the member information and transmission speed and transmit advertisement data of small data volume to a moving wireless Internet user and transmit those of big data volume to a high-speed wire Internet user.

In this instance, the user terminals 940, 950, 960, 970, and 973 receive advertisement data, concurrently find the Internet broadcasting station, access the Internet broadcasting station once the address is found, receive supplementary data, and execute the contents data as shown in FIG. 3.

Since the commercial Internet set-top box B 976 provides high-quality images and sounds that are excellent in comparison to those provided by the general product, it is desirable to receive a use fee from the user and issue a use allowance each time.

It is more desirable to only receive a use fee except in advertisement viewing when doing business using the Internet set-top box A 973 in a video room or a game room.

The Internet broadcasting stations A, B, C, . . . do not duplicate the titles of the contents data when producing the contents data, and they register the address of the server that stores the contents data and restoration information to the contents manager 981 of the relay broadcasting station and store the address in the contents address and restoration information address database 984.

The users are required to either pay the use fee each time the user uses the contents data, or view the advertisements of the relay broadcasting station together with the contents data when the user does not desire to pay the fee. The use fee and the advertisements are varied according to the contents data and determination of the relay broadcasting station.

The relay broadcasting station 980 stores programs for automatically and massively producing specific contents data, the specific execution program, and all kinds of information needed for opening the Internet broadcasting station according to the present invention on recording media such as CDs, and provides them to the general Internet broadcasting stations free of charge, or provides through the Internet the above-noted specific contents-developing tool and all kinds of information required for it to general Internet broadcasting stations all over the world.

By cooperation with terminal makers, such as makers of various wireless Internet mobile stations, wireless Internet PDAs, and wireless Internet multimedia terminals for vehicles, the relay broadcasting station develops specific execution programs that may be installed in the above-noted makers' terminals.

The relay broadcasting station also develops varied versions of the specific execution program for Internet users who use general IBM or McIntosh platform computers, and distributes them to any users free of charge through the Internet broadcasting stations A, B, and C, various portal sites shared file directories, recording media such as CDs and DVDs, or default installations in newly assembled computers of computer assembling companies.

The wireless Internet mobile stations or the wireless Internet multimedia terminals (a transformed PC) installed in the vehicle require RAM capacity of at least 23 M to about 128 M (recommended capacity) so as to access the Internet broadcasting station and fluently use various moving picture services, and they also require free data communication with general computers via cables in the like method of the wireless Internet PDAs.

In the case of using relatively short moving picture data such as music videos of about 3 to 5 minutes running time, as opposed to long moving pictures such as the movies, about 32 M RAM may be sufficient.

In the case of using the Internet broadcasting system through a mobile terminal, the user may freely use the service with a very low fee according to the current packet fee system.

When the user desires to use the contents data, it is required for the user to receive restoration information through the wireless Internet when the user has previously downloaded music videos or movie data to a general computer and stored them in the memory of a terminal such as a PDA through a data transmission cable. Accordingly, the user may use the contents data at a very low cost with a clear screen and great sound and without distortion or interruption in a fast moving train or a car, compared to the conventional streaming method wherein the terminal is continuously connected to the Internet to receive all data during the movie running time (about 90 to 120 minutes).

Also, even when the user directly receives the desired contents data through the mobile terminal and uses them, they may download all data within a much shorter time compared to the actual movie running time, and accordingly the present invention requires less communication time when compared to the streaming technique. When the IMT2000 service starts, the user may receive data at 2 M per second when the user is stationary, and hence, when assuming that the actual data transmission speed is about 1 M per second, that is, a half of the standard transmission speed of 2 M, the user may download the volume of a single movie (about 90 to 120 minutes of running time) in 3 to 7 minutes since the screen size of the moving picture data used by the wireless Internet mobile stations, PDAs, or multimedia terminals for vehicles is small and the corresponding total data capacity is also small.

Therefore, the users may save on communication fees by reducing communication time, and they use the terminal less frequently so that the battery installed in the terminal is used less, so the terminal may be used longer. Internet users may collect and keep desired contents data for respective categories and subjects of entertainment according to their interests, as they desire.

As described above, in the preferred embodiment of the present invention, users may freely receive various desired contents such as movies, music videos, dramas, comics, novels, photo albums, computer games, or video games according to their interests from an Internet broadcasting station or through recording media such as CD-ROMs and DVD-ROMs distributed by the Internet broadcasting station free of charge, collect and keep them, and use them at any time.

Since the users execute most of the contents previously downloaded, the users may execute various contents with top image and sound qualities (e.g., DVD quality) and at any time without being greatly interfered with by interruptions caused by heavy Internet traffic.

In particular, the users may freely use the moving picture service such as for movies or music videos with good image and sound qualities in a fast moving train, a subway, or a car, using the wireless Internet mobile station or PDA with a very much lower communication fee. The users may also receive various quality moving picture services such as famous films, music videos, dramas, plays, and sitcoms with good quality images and sound through the Internet in a fast running car on an expressway using the wireless Internet multimedia terminal installed in a car.

The contents data downloaded to the users, such as movies or novels, are executed on the specific execution program, and the users are required to initially access the Internet broadcasting station through the execution program and obtain a use allowance so as to use the contents data, and the Internet broadcasting station either receives the use fee from the user or sends customized advertisements to the user terminal for each issuing the use allowance, and accordingly, the Internet broadcasting station earns corresponding advertisement profits, completely manages and controls the users, and provides effective advertising, thereby gaining much profit from the use fees and advertisements.

Further, illegal program reproductions frequently occurring on the Internet because of charging for contents may be prevented by providing the users with a huge amount of diverse contents data including movies and computer games free of charge, allowing the users to collect and keep them according to their interests, allowing the users to freely use them when viewing the contents together with the advertisements provided at the start, the middle, and the end of the contents data, and fully satisfying the users' possessiveness. (Some contents require the users to pay a predetermined fee.)

Since the various contents data provided by the Internet broadcasting station through a free downloading service are converted according to a specific conversion method, when reproducing them and attempting to use them, the users need to connect the user terminal to the Internet broadcasting station through the specific execution program and obtain a use allowance to use the contents data, and therefore the Internet broadcasting stations and the authors who have copyrights of various contents may provide and distribute their programs to users on the Internet, with no more fear of illegal reproduction. Rather, they may hope that Internet users all around the world reproduce their programs through legal or even unauthorized reproduction processes, collect desired ones, keep them, and use them everyday.

When using the conventional streaming method to view the moving pictures through a mobile station, it is required for the user to operate the mobile station and be connected to the wireless Internet for two hours to view a movie with a 2-hour running time, but the present invention enables the user to previously receive desired data in a shorter time frame, store the same, and then view the movie, and accordingly the user may greatly reduce the time for using the wireless Internet and the time for using a battery of the terminal, thereby allowing a longer using time than with the conventional streaming method.

If the IMT200 standard supports a data transmission speed of about 2 M per second as announced, the user may store most kinds of data in the user terminal (wireless Internet mobile station or PDA) in 3 to 7 minutes after connecting to the wireless Internet.

Hence, even when the fee system for the Internet mobile terminal (e.g., an IMT2000 terminal) is changed to that of the general mobile terminal, the use fee is greatly reduced, and further, the user may use the contents only if the user receives restoration information and supplements it when the user has previously received most of the contents data, and accordingly, the user may use high-quality moving picture services in a fast moving train or a subway as desired.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An internet-broadcasting contents consignment sale system connected to authors for receiving a plurality of authored pieces and providing the authored pieces to a user terminal, the system comprising:

a contents data management server for converting contents data of the authored pieces to produce converted contents data in a respective format for the respective contents data, generating restoration information corresponding to the respective converted contents data for restoring the converted contents data, and transmitting a pair of the converted contents data and the corresponding restoration information for the respective contents data to the user terminal through internet when the user selects desired contents of the authored pieces;

a data storage unit for storing the pair of the converted contents data and the corresponding restoration information for restoring the converted contents data from the contents data management server, user's information, and description of the corresponding contents data; and an execution program provided by an internet broadcasting station to the user terminal for restoring the converted contents data transmitted from the contents data management server using the restoration information to produce restored contents data and executing the restored contents data, wherein the execution program begins restoring the converted contents data and executing the restored contents data after a portion of the converted contents data is stored in the data storage unit and continues restoring and executing while downloading remaining portions of the contents data, so that the user can download and view the contents concurrently.

2. The system of claim 1, wherein the restoration information and the converted contents data are temporarily stored in a storage device of the user terminal through the internet to perform tasks, and be deleted from the storage device of the user terminal after completing the tasks.

3. The system of claim 1, wherein the restoration information comprises advertisement data, and the contents data management server further comprises an advertisement data manager for transmitting the advertisement data to the user terminal wherein the user can view the contents with advertisement.

4. The system of claim 1, wherein the restoration information comprises advertisement data and the contents data management server further comprises:

a member and use information storage for storing member and use information; and an advertisement data storage for storing the advertisement data; and a member and use information manager.

5. The system of claim 1, wherein the user terminal continues restoring the converted contents data using the corresponding restoration information until the duration of execution of the user terminal is terminated upon use time and use number of the user according to an internet broadcasting station's business policies.

6. An internet-broadcasting contents consignment sale method for transmitting a plurality of contents data of a plurality of authored pieces to a user terminal connected through the internet, the method comprising:

converting the contents data of the authored pieces to produce converted contents data in a respective format for the respective contents data, generating restoration information corresponding to the respective converted contents data for restoring the converted contents data, and storing the converted contents data and the corresponding restoration information to a data storage unit;

transmitting the converted contents data and the corresponding restoration information to the user terminal through internet when the user selects desired contents of the authored pieces; and restoring the converted contents data to produce converted contents data using the corresponding restoration information and executing the restored contents data, wherein the restoring and the executing begin after a portion of the converted contents data is stored and continue while downloading remaining portions of the contents data.

7. The method of claim 6, wherein the restoration information comprises advertisement data, and the method further comprises:

operating the user terminal to execute the advertisements data along with the converted contents data, when the user selects to view the contents and the advertisements with no payment of the use fee of the contents data.

8. The method of claim 6, wherein the restoring and the executing are performed until the duration of execution of the user terminal are terminated upon use time and use number of the user according to an internet broadcasting station's business policies.

9. An internet-broadcasting contents consignment sale system connected to a plurality of authors, for receiving a plurality of authored pieces, and providing the authored pieces to a user terminal, the system comprising:

a contents data management server for converting contents data of the authored pieces to produce converted contents data in a respective format for the respective contents data, generating restoration information for restoring the respective converted contents data to produce restored contents data, and transmitting a pair of the converted contents data and the corresponding restoration information for the respective contents data to the user terminal through internet when the user selects desired contents of the authored pieces;

a data storage unit for storing the pair of the converted contents data and the corresponding restoration information for restoring the converted contents data from the contents data management server, and user's information, the restoration information including description of the contents data;

a member and use information manager for managing member information provided when the user registers on the internet broadcasting system;

a contents introducer for generating the descriptions of the contents data; and an execution program provided by an internet broadcasting station to the user terminal for restoring the converted contents data provided from the contents data management server using the restoration information and executing the restored contents data.

10. An internet-broadcasting contents consignment sale method for receiving a plurality of contents data of authored pieces provided by a plurality of internet broadcasting stations through a relay broadcasting station, the method comprising:

connecting the internet broadcasting stations through the relay broadcasting station;

converting the contents data of the authored pieces to produce converted contents data in a respective format for the respective contents data, generating restoration information corresponding to the respective converted contents data, and storing a pair of the converted contents data and the corresponding restoration information to the respective internet broadcasting stations; and transmitting the pair of the converted contents data and the corresponding restoration information through the relay broadcasting station to user terminals when the user selects desired contents of the authored pieces at the relay broadcasting station, wherein a relay broadcasting station comprises a contents introducer and a contents storage for storing the converted contents data provided by the internet broadcasting stations, and the relay broadcasting station receives membership entrance from the users, performs membership and use management, receives use fees from the users to issue use allowances on various contents to the users so that the users may receive the converted contents data and the corresponding restoration information from the internet broadcasting stations through the relay broadcasting station and use them, and wherein the user terminal begins restoring the converted contents data using the corresponding restoration information and executing the restored contents data after a portion of the converted contents data is stored and continues restoring and executing while downloading remaining portions of the contents data, so that the user can download and view the contents concurrently.

11. The method of claim 10, further comprising:

managing member information provided when the user registers for membership entrance to the relay broadcasting station so as to use and install a specific execution program.

12. An internet-broadcasting contents consignment sale method for transmitting a plurality of contents data to user terminals connected through a internet, comprising:

converting the contents data to produce converted contents data in a respective format for the respective contents data, and storing the converted contents data and restoration information corresponding to the respective converted contents data for restoring the converted contents data;

transmitting a pair of the converted contents data and the corresponding restoration information to the user terminal through the internet;

transmitting the pair of the converted contents data and the corresponding restoration information from the user terminal to a mobile station; and restoring the converted contents data to produce restored contents data and executing the restored contents data at the mobile station, wherein the restoring and the executing begin after a portion of the converted contents data is stored and continue while downloading remaining portions of the contents data.

13. An internet-broadcasting contents consignment sale method comprising:

converting the contents data to produce converted contents data in a respective format for the respective contents data, and storing a pair of the converted contents data and restoration information corresponding to the respective converted contents data for restoring the converted contents data in a data storage unit;

transmitting the pair of the converted contents data and the corresponding restoration information to an internet set-top box through the internet when the internet set-top box of the user requests the converted contents data;

restoring the converted contents data to produce restored contents data using the restoration information at the internet set-top box and executing the restored contents data; and checking the contents data executed at the internet set-top box to receive use fees according to categories and number of executions of the contents, wherein the restoring and the executing begin after a portion of the converted contents data is stored and continues while downloading remaining portions of the contents data so that the user can download and view the contents concurrently.

14. An internet-broadcasting contents consignment sale system connected to authors for receiving a plurality of authored pieces, and providing the authored pieces to a user terminal, the system comprising:

a contents data management server for converting contents data of the authored pieces to produce converted contents data in a respective format for the respective contents data, generating restoration information corresponding to the respective converted contents data for restoring the converted contents data, and transmitting a pair of the converted contents data and the corresponding restoration information to the user terminal through internet when the user selects desired contents of the authored pieces;

a data storage unit for storing the pair of the converted contents data and the corresponding restoration information for restoring the converted contents data, and user's information, the restoration information including description of the contents data; and an execution program provided by an internet broadcasting station to the user terminal for restoring the converted content data using the restoration information and executing the restored content data.

15. The system of claim 14, wherein the restoration information further comprises advertisement data and the contents data management server further comprises an advertisement data manager for transmitting the advertisement data to the user terminal wherein the user can view the contents with advertisement.

16. The system of claim 14, wherein the restoration information further comprises advertisement data and the contents data management server further comprises:

a member and use information storage for storing member and use information; and an advertisement data storage for storing the advertisement data; and a member and use information manager.

17. The system of claim 14, wherein the user terminal continues restoring the converted contents data using the corresponding restoration information until the duration of execution of the user terminal is terminated upon use time and use number of the user according to an internet broadcasting station's business policies.

18. An internet-broadcasting contents consignment sale method for transmitting a plurality of contents data to a user terminal connected through the internet, the method comprising:

converting contents data of the authored pieces to produce converted contents data in a respective format for the respective contents data, generating restoration information corresponding to the respective converted contents data for restoring the converted contents data, and storing a pair of the converted contents data, the corresponding restoration information for restoring the converted contents data, and user's information, the restoration information including description of the contents data;

transmitting the pair of the converted contents data and the corresponding restoration information to the user terminal through internet when the user selects desired contents of the authored pieces; and restoring the converted contents data using the restoration information provided in the user terminal to produce restored contents data.

* * * * *